United States Patent
Lutz et al.

(10) Patent No.: US 9,894,833 B2
(45) Date of Patent: Feb. 20, 2018

(54) CUTTER BAR

(71) Applicant: GEBRUEDER BUSATIS GESELLSCHAFT M.B.H., Purgstall an der Erlauf (AT)

(72) Inventors: Wolfgang Lutz, Wieselburg (AT); Markus Nadlinger, Euratsfeld (AT)

(73) Assignee: Gebrueder Busatis Gesellschaft m.b.H., Purgstall an der Erlauf (AT)

( * ) Notice: Subject to any disclaimer, the term of this patent is extended or adjusted under 35 U.S.C. 154(b) by 12 days.

(21) Appl. No.: 15/051,887

(22) Filed: Feb. 24, 2016

(65) Prior Publication Data
US 2017/0020066 A1 Jan. 26, 2017

(30) Foreign Application Priority Data
Feb. 24, 2015 (AT) .................................. 50139/2015

(51) Int. Cl.
*A01F 29/09* (2010.01)
*A01D 34/14* (2006.01)
(Continued)

(52) U.S. Cl.
CPC ............. *A01D 34/14* (2013.01); *A01D 34/40* (2013.01); *A01F 29/06* (2013.01); *A01F 29/09* (2013.01);
(Continued)

(58) Field of Classification Search
CPC ........ A01D 34/52; A01D 34/62; A01D 34/43; A01D 34/47; A01D 34/49; A01D 43/00; A01D 34/14; A01D 34/40; A01F 29/06; A01F 29/095; A01F 29/09; B02C 18/18; B26D 1/38

USPC ........... 37/460; 56/250, 296; 83/356.3, 658, 83/674; 241/101.762, 197, 222, 247, 241/292.1, 300, 300.1
See application file for complete search history.

(56) References Cited

U.S. PATENT DOCUMENTS 3,779,123 A * 12/1973 Chafee ..................... B26D 1/38
241/221
3,805,660 A * 4/1974 Burrough .............. A01F 29/095
241/101.762
(Continued)

FOREIGN PATENT DOCUMENTS

| AT | 398509 B | 12/1994 |
|---|---|---|
| AT | 404658 B | 1/1999 |

*Primary Examiner* — Robert E Pezzuto
(74) *Attorney, Agent, or Firm* — Laurence A. Greenberg; Werner H. Stemer; Ralph E. Locher

(57) ABSTRACT

A cutter bar has a cutter body with a substantially rectangular cross section formed by an upper face, two side faces and a lower face. The upper face together with at least one side face defines a cutting edge, which is formed by one or more hard metal profile strips fastened in a groove in the cutter body. The wall of the groove which adjoins the upper face of the cutter body encloses with the upper face of the cutter body an angle less than 90°, preferably 89 to 15°, particularly preferably 80 to 40°. The wall of the groove which adjoins the lateral face of the cutter body encloses with the lateral face of the cutter body an angle less than 90°, preferably 89 to 15°, particularly preferably 80 to 40°. The hard metal profile strip or hard metal profile strips is or are positively inserted in the groove.

20 Claims, 4 Drawing Sheets

(51) Int. Cl.
*A01F 29/06* (2006.01)
*B02C 18/18* (2006.01)
*B26D 1/00* (2006.01)
*B26D 1/38* (2006.01)
*A01D 34/40* (2006.01)
*B26D 7/00* (2006.01)
*B23P 15/40* (2006.01)
*A01D 101/00* (2006.01)

(52) U.S. Cl.
CPC ............ *B02C 18/18* (2013.01); *B26D 1/0006* (2013.01); *B26D 1/38* (2013.01); *A01D 2101/00* (2013.01); *B23P 15/40* (2013.01); *B26D 2001/002* (2013.01); *B26D 2001/0053* (2013.01); *B26D 2001/0066* (2013.01); *B26D 2007/0012* (2013.01)

(56) References Cited

U.S. PATENT DOCUMENTS

| | | | | |
|---|---|---|---|---|
| 3,894,322 A | * | 7/1975 | Pano | B23B 27/007 407/110 |
| 5,829,700 A | * | 11/1998 | Pianca | A01F 29/06 241/242 |
| 6,637,687 B2 | * | 10/2003 | Dillon | A01F 29/09 241/242 |

* cited by examiner

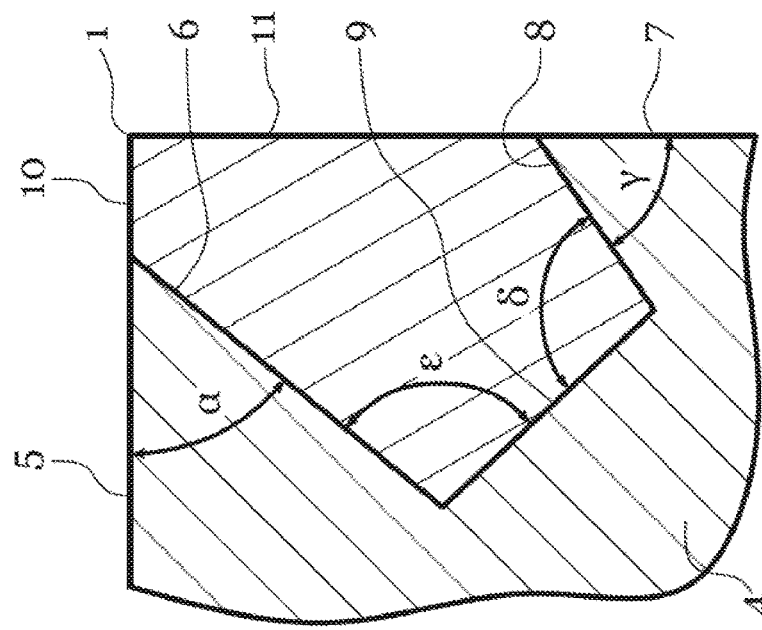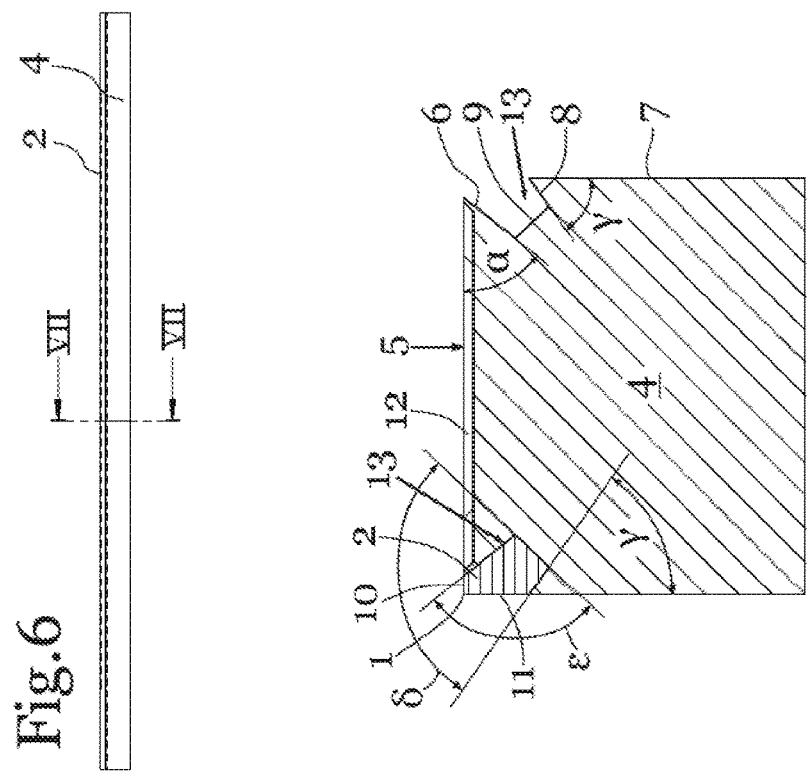

CUTTER BAR

BACKGROUND OF THE INVENTION

Field of the Invention

The invention relates to a cutter bar having a substantially rectangular cross section formed by an upper face, two side faces and a lower face, the upper face forming with at least one side face a cutting edge formed by one or more hard metal profile strip(s) fastened in a groove in a cutter body.

A cutter bar for forage harvesters is known, for example, from AT 398 509 B. As described in this printed publication, it is known, in order to increase the service life of such a cutter bar, to apply a layer of hard substance to the cutter body by thermal spraying or PTA build-up welding. Plasma coating processes of this type are very complex and therefore costly. A further problem is posed by the high temperatures, which can adversely affect the hard substance material, as well as the material of the cutter body. Only if quite specific process parameters are precisely observed is a sufficient hardness of the hard substance layer, a good bond between hard material layer and cutter body, as well as a straight cutting edge, and thus a regular cutting gap, guaranteed. Already small deviations in the process lead to lower service lives of the cutter bar and an unsatisfactory cutting result.

An easier to produce and more cost-effective cutter bar has been developed, as described in AT 404 658 B. In this cutter bar, the cutting edge is formed by one or more hard metal profile strips, which is or are connected to the cutter body by mechanical connecting means, a layer of adhesive, or a solder layer.

Due to the strong forces which arise in the crushing of cutting stock between the cutter bar and the blades operating against this same, in this last described cutter bar, however, it repeatedly ends up that the adhesive or soldered joint fractures and thus the hard metal profile strip breaks off.

BRIEF SUMMARY OF THE INVENTION

The object of the present invention is therefore to provide an improved cutter bar in which the break-off of the hard metal profile strips is avoided.

The object is achieved by a cutter bar having a substantially rectangular cross section formed by an upper face, two side faces and a lower face, the upper face forming with at least one side face a cutting edge, which is formed by one or more hard metal profile strip(s) fastened in a groove in a cutter body, wherein that wall of the groove which adjoins the upper face of the cutter body encloses with the upper face of the cutter body an angle less than 90°, preferably 89 to 15°, particularly preferably 80 to 40°, and wherein that wall of the groove which adjoins the lateral face of the cutter body encloses with the lateral face of the cutter body an angle less than 90°, preferably 89 to 15°, particularly preferably 80 to 40°, and the hard metal profile strip or hard metal profile strips is or are positively inserted in the groove. As a result of the inventive orientation of the groove walls relative to the upper and the lateral walls of the cutter body, and also the form closure, the considerable forces which can act on the hard metal profile strip of the cutter bar in the course of the cutting are relayed into the center of the cutter body more strongly than in known cutter bars, the hard metal profile strips are thereby pressed into the cutting body and can be supported against the cutter body, so that the connecting layer between cutter body and hard metal profile strip is not so heavily loaded and a durable joint is obtained.

According to one embodiment, the groove provided in the cutter body is acute angled, and that wall of the groove which adjoins the upper face of the cutter body encloses with that wall of the groove which adjoins the lateral face of the cutter body an angle of 20 to 89°, preferably 45 to 70°, in particular 60°. This groove is easy to produce, the insertion and fastening of the hard metal profile strips is unproblematic.

In this embodiment, that wall of the groove which adjoins the upper face of the cutter body encloses with the upper face of the cutter body an angle of 80 to 60°, and that wall of the groove which adjoins the lateral face of the cutter body encloses with the lateral face of the cutter body an angle of 80 to 60°. By virtue of this geometry, particularly good stability is obtained.

In an alternative embodiment, the groove provided in the cutter body has a wall adjoining the upper face of the cutter body, a wall adjoining the lateral face of the cutter body, and a groove bottom extending between these walls, the angle between each wall of the groove and the groove bottom preferably being equally large and amounting to 65 to 179°, preferably 85 to 98°. This variant produces a very good form closure with good force transmission.

In the cutter bar according to the invention, the upper dimension of the hard metal profile strip or hard metal profile strips is 1 to 5 mm, preferably 2 to 4 mm, particularly preferably 3 mm, and the lateral dimension of the hard metal profile strip or hard metal profile strips is 5 to 10 mm, preferably 6 to 9 mm, particularly preferably 7.5 mm. These dimensions have proved to deliver long service lives.

The hard metal profile strip or hard metal profile strips can be fastened in the groove with an adhesive.

Preferably, the hard metal profile strip or hard metal profile strips is or are fastened in the groove with a solder layer.

On the upper face of the cutter body a wear resistant layer can be applied, preferably by flame spraying, in order to prevent excessive wearing of the surface of the cutter bar.

The wear resistant layer preferably reaches up to the groove or grooves in the cutter body. Thus, no erosion of the material of the cutter body can occur and there are no possibilities of force application to the hard metal profile strips, which could cause these same to break off.

Alternatively, between the wear resistant layer and the hard metal profile strip or hard metal profile strips can be found a or respectively a coating-free zone of preferably 1 to 5 mm, more preferably 2 to 4 mm, particularly preferably 3 mm. The more rapid wearing of the material of the cutter body gives rise to a self-sharpening effect at the hard metal profile strips.

BRIEF DESCRIPTION OF THE SEVERAL VIEWS OF THE DRAWING

The invention shall now be explained on the basis of the design variants represented in the appended drawings.

Here

FIG. 6 shows a further embodiment of the cutter bar according to the invention in a side view.

FIG. 7 shows in enlarged representation the cutter bar from FIG. 6 along the section VII-VII.

FIG. 8 shows schematically a possible design variant of the second embodiment.

DESCRIPTION OF THE INVENTION

Figure 1:
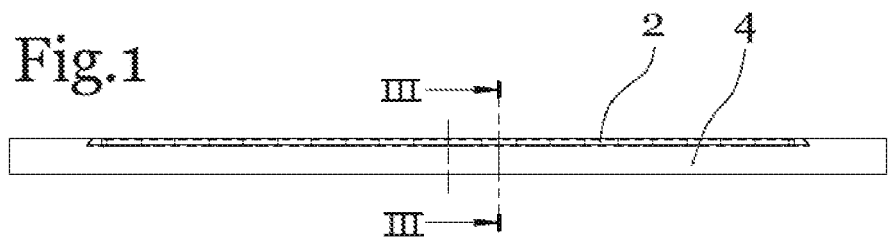
FIG. 1 shows a cutter bar according to the invention in a side view.
Figure 2:
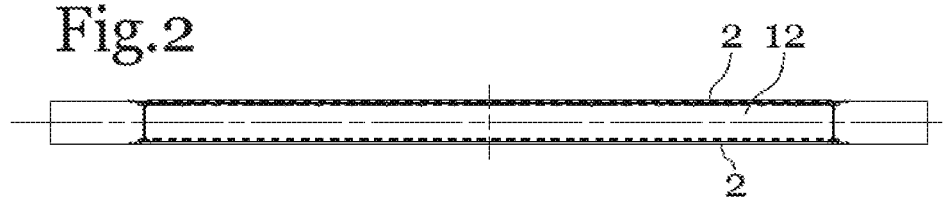
FIG. 2 shows the cutter bar according to the invention from FIG. 1 in a view from above.

The cutter bar represented in FIGS. 1 and 2 has a cutter body 4 and has on its two upper longitudinal edges respectively a hard metal profile strip 2. In addition, the cutter bar is provided on its surface with a wear resistant layer 12, which on both sides reaches up to the hard metal profile strips.

Figure 3:
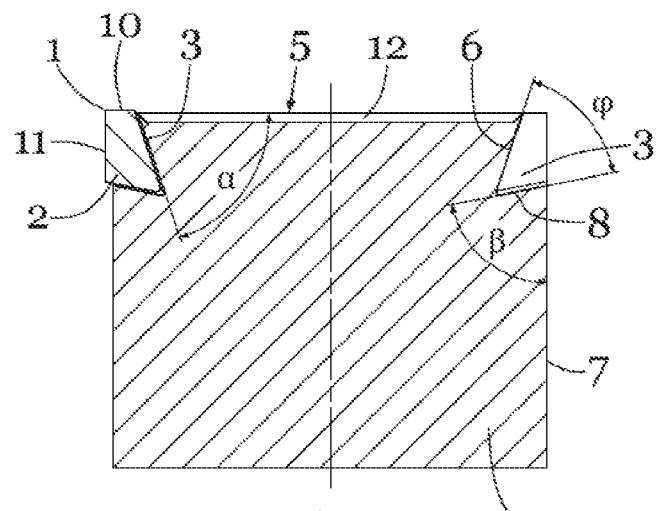
FIG. 3 shows in enlarged representation a cross section through the cutter bar from FIG. 1 along the sectional line III-III.

As can be seen in FIG. 3, the cutter bar is substantially rectangular in cross section. The cutter body 4 has a lower face, two side faces 7 and an upper face 5. In the region of the upper longitudinal edges of the cutter bar, a groove 3 is respectively produced, for example by milling, on both sides in the cutter body 4. Each groove 3 has a wall 8 adjoining a side face 7 of the cutter body 4 and a wall 6 adjoining the upper face 5 of the cutter body 4. The groove walls 6 and 8 intersect at an acute angle φ, which in the represented example lies in the region of about 60°, which is also a preferred domain for this angle. However, angles φ of 20° to 89° are also conceivable. According to the invention, the groove wall 8 adjoining the side face 7 of the cutter body 4 encloses with the side face 7 an angle β less than 90°, preferably 89° to 15°, particularly preferably 80° to 40°, in particular 80° to 60°. In the represented example, this angle β lies in the region of about 79°. According to the invention, the groove wall 6 adjoining the upper face 5 of the cutter body 4 encloses with the upper face 5 of the cutter body 4 an angle α less than 90°, preferably 89° to 15°, particularly preferably 80° to 40°, in particular 80° to 60°. In the represented example, this angle α lies in the region of about 71°.

In the two grooves 3 are inserted, as represented here only on the left side, hard metal profile strips 2, the dimensions of which are chosen such that the hard metal profile strips 2 fit positively into the grooves 3. That is to say, each strip 2 has a face extending parallel to the groove wall 6 and a face extending parallel to the groove wall 8, which faces of the hard metal profile strip form an angle φ with each other. The two other faces of each hard metal profile strip extend parallel to the upper face 5 and to the side face 7 of the cutter body 4 and stand at a right angle to each other, whereby the cutting edge 1 is formed of hard metal. The hard metal profile strips 2 are fastened in the grooves 3 mechanically or by a bonded joint or a soldered joint. As a result of the oblique course of the groove walls 6 and 8 and of the faces, parallel thereto, of the hard metal profile strips 2, forces which are applied to the hard metal profile strips 2 when the cutting stock is cut, are relayed into the center of the cutter body 4. The hard metal profile strips 2 are pressed by these forces more firmly into the grooves 3 and the strips 2 can be well supported against the cutter body 4, so that the joint between the hard metal profile strips 2 and the cutter body 4 is exposed to lower loads than in conventional cutter bars having a right-angled groove. On the upper face 5 of the cutter body 4, a wear resistant layer 12, which prevents premature wearing of the base material of the cutter body 4, extends between the two grooves 3. This wear resistant layer 12 reaches laterally up to the hard metal profile strips 2. The grooves 3 in the represented embodiment, in particular having an angle φ in the region of the represented angle, can be easily produced with a milling tool, and the insertion of the hard metal profile strips 2 is unproblematic with the represented geometry.

Figure 5:
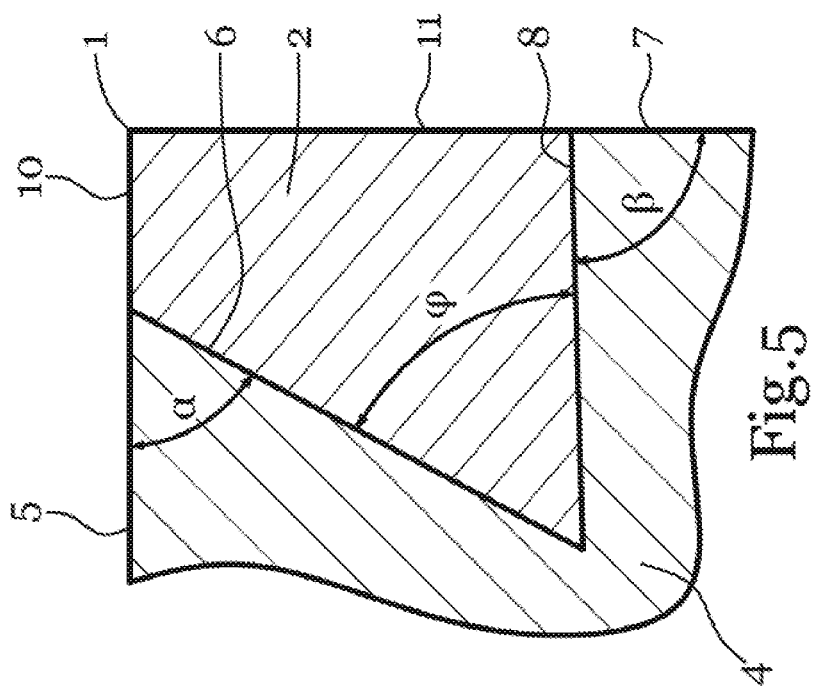
In FIGS. 4 and 5, geometrically different design variants of a first embodiment of the cutter bar according to the invention are represented schematically.
Figure 4:
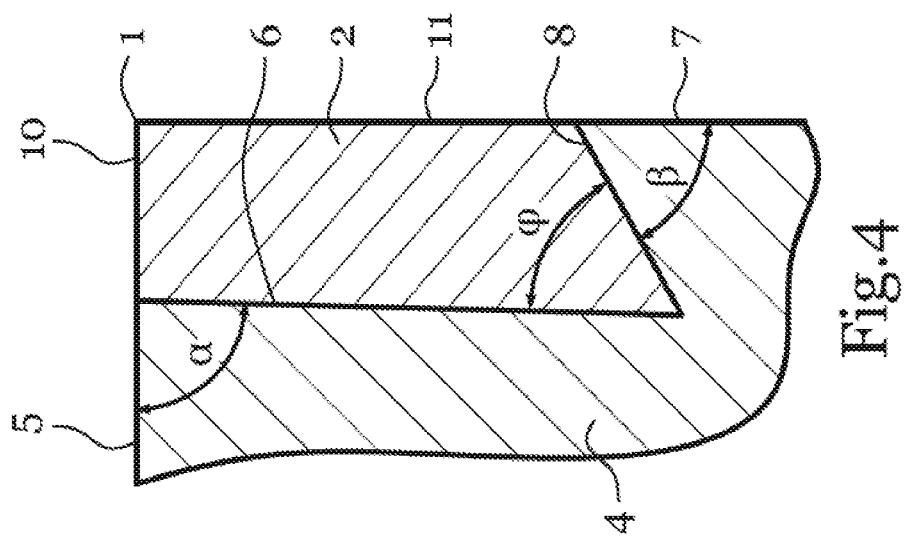

As can be seen by comparing the geometries in FIGS. 4 and 5, the design variant of the invention having an acute angled groove can be very different. Thus, the angle α between the upper face 5 of the cutter body 4 and the groove wall 6 adjoining the upper face 5 of the cutter body 4 lies in FIG. 4 at about 88°, while in FIG. 5 it lies at about 62°. The angle β between the side face 7 of the cutter body 4 and the groove wall 8 adjoining the side face 7 of the cutter body 4 lies in FIG. 4 at about 82°, and in FIG. 5 at about 88°. In both cases, there is thus obtained between the groove wall 6 and the groove wall 8 an angle of about 60°, which can be effectively produced by milling in the cutter body 4, though angles, too, of 45° to 70° for the milling of the groove cause absolutely no production problems and a milling angle between 20° and 89° is possible in principle. Despite the very different geometries in FIGS. 4 and 5, the inventive selection of the angle produces the same effect, namely that, if the hard metal profile strip 2 is exposed to strong forces in the course of the cutting, the slope of the groove walls 6 and 8 causes these forces to be transmitted into the inside of the cutter body 4 and the hard metal profile strip 2 is pressed by the forces into the groove 3, whereupon the hard metal profile strip 2 can be supported against the cutter body 4, so that the joint between the hard metal profile strip 2 and the cutter body 4 is less heavily loaded than would be the case with a right-angled groove. A break-off of the hard metal profile strip 2 from the cutter body 4 therefore occurs less frequently than in the prior art, whereby the cutter bar according to the invention has a higher service life.

The two other faces of the hard metal profile strip 2, which do not bear against the groove faces 6, 8, form in the cross section of the hard metal profile strip 2 mutually right-angled sides 10, 11, the right angle forming the cutting edge 1 of the cutter bar. The upper side 10 of the hard metal profile strip has a length of 1 to 5 mm, preferably 2 to 4 mm, particularly preferably 3 mm, and the lateral face 11 of the hard metal profile strip 2 has a length of 5 to 10 mm, preferably 6 to 9 mm, particularly preferably 7.5 mm.

FIGS. 6 to 9 show another embodiment of the invention, in which, in contrast to the preceding embodiment, the groove 13 is not acute angled, but rather a groove bottom 9 extends between the groove wall 6 adjoining the upper face 5 of the cutter body 4 and the groove wall 8 adjoining the side face 7 of the cutter body 4. Correspondingly, the cross section of the groove 13 and of the hard metal profile strip 2 forms a pentangle. The angles δ, ε between the groove walls 6, 8 and the groove bottom 9 are obtuse and lie between 65 and 179°, preferably 85 and 98° and are preferably equally large. Those side faces 10 and 11 of the hard metal profile strip 2 which do not bear against one of the groove walls 6, 8 or the groove bottom 9 stand at a right angle to each other and form the cutting edge 1. The length measurement of the side faces 10 and 11 in the cross section of the hard metal profile strip 2 amounts also in this embodiment to 1 to 5 mm, preferably 2 to 4 mm, particularly preferably 3 mm for the upper side 10, and 5 to 10 mm, preferably 6 to 9 mm, particularly preferably 7.5 mm for the lateral side 11.

Figure 9:
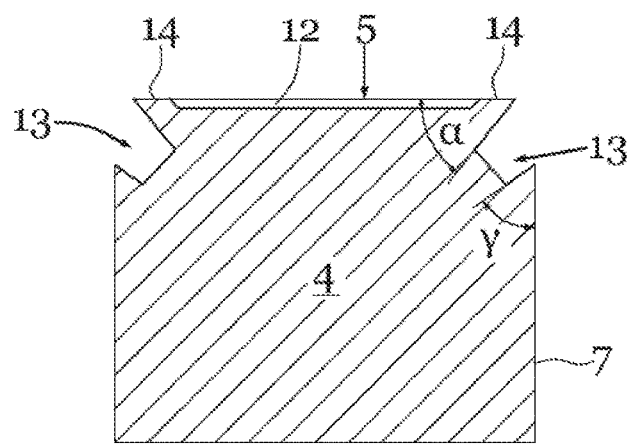
FIG. 9 shows a variant of the cutter bar from FIG. 7.

Also in FIGS. 7 and 9, the cross section of the cutter bar shows, at both upper longitudinal edges, grooves 13 for the fastening of hard metal profile strips 2, wherein in FIG. 7 only in the left-hand groove 13 the inserted hard metal profile strip 2 and in FIG. 9 in none of the grooves is a hard metal profile strip represented. The invention also comprises, however, design variants of the cutter bar in which a groove for a hard metal profile strip is provided only on one of the sides. This applies both to groove shapes which are configured similarly as in FIG. 3, and to groove shapes which are configured similarly as in FIGS. 7 and 9. The grooves can be produced, for example, by milling.

According to the invention, in FIGS. 7 and 9 the groove wall 8 adjoining the side face 7 of the cutter body 4 encloses with the side face 7 an angle γ less than 90°, preferably 89° to 15°, particularly preferably 80° to 40°. In the represented examples, this angle γ lies in the region of about 55°. According to the invention, the groove wall 6 adjoining the upper face 5 of the cutter body 4 encloses with the upper face of the cutter body 4 an angle α less than 90°, preferably 89° to 15°, particularly preferably 80° to 40°. In the represented examples, this angle α lies in the region of about 50°. The cross section of the hard metal profile strip 2 has the same geometry as the groove 13 and therefore fits positively into the groove 13 and all forces which are exerted on the hard metal profile strip 2 are transmitted into the cutter body 4 on which the hard metal profile strip 2 is supported, so that the joint between the hard metal profile strip 2 and the cutter body, for example a soldered joint, is relieved of load.

Extending between the two grooves 13, on the upper face 5 of the cutter body 4, is a wear resistant layer 12, which prevents premature wearing of the base material of the cutter body 4. In FIG. 7, this wear resistant layer 12 reaches laterally up to the hard metal profile strips 2. As a result, the softer material of the cutter body 4 cannot be worn away and no possibilities of force application to the hard metal profile strips are given. That is in particular of advantage in grass cutter bars, where foreign bodies often cause hard metal profile strips to break off.

In the variant shown in FIG. 9, between the wear resistant layer and each groove, and thus each hard metal profile strip, is found a coating-free zone 14, which is 1 to 5 mm, preferably 2 to 4 mm, particularly preferably 3 mm wide. The wear resistant layer 12 thus prevents the base material of the cutter body 4 from becoming prematurely worn in the middle on both sides of the longitudinal center plane of the cutter bar. In the coating-free zones, on the other hand, wear to the base material, which wear progresses more rapidly than the wear to the hard metal profile strips, is permitted, whereby a self-sharpening effect of the working edge is obtained. Such cutter bars are suitable for the cutting of corn.

The invention claimed is:

1. A cutter bar, comprising:
a cutter body having a substantially rectangular cross section formed by an upper face, two side faces and a lower face;
said upper face together with at least one said side face forming a cutting edge and having a groove formed therein;
said groove having a first wall adjoining said upper face of said cutter body and enclosing with said upper face an angle less than 90°;
said groove having a second wall adjoining said at least one side face of said cutter body and enclosing with said at least one side face an angle less than 90°; and
at least one hard metal profile strip inserted and positively fastened in said groove of said cutter body, said at least one hard metal strip having a cross section with a strip upper face and a strip lateral face, a ratio of a length of said strip upper face to a length of said strip lateral face being in a range of 1:2 to 1:10.

2. The cutter bar according to claim 1, wherein said angle enclosed by said upper face and said first wall of said groove lies between 89 and 15°.

3. The cutter bar according to claim 2, wherein said angle enclosed by said upper face and said first wall of said groove lies between 80 and 40°.

4. The cutter bar according to claim 1, wherein said angle enclosed by said at least one side face and said second wall of said groove lies between 89 and 15°.

5. The cutter bar according to claim 4, wherein said angle enclosed by said at least one side face and said second wall of said groove lies between 80 and 40°.

6. The cutter bar according to claim 1, wherein said groove is an acute-angled groove, and said first wall and said second wall of said groove enclose an angle of 20 to 89°.

7. The cutter bar according to claim 6, wherein said first and second walls enclose an angle of 45 to 70°.

8. The cutter bar according to claim 6, wherein said first and second walls enclose an angle of 60°.

9. The cutter bar according to claim 6, wherein said first wall of said groove encloses with said upper face of said cutter body an angle of 80 to 60°, and wherein said second wall of said groove encloses with said at least one side face an angle of 80 to 60°.

10. The cutter bar according to claim 1, wherein said groove in said cutter body has said first wall, said second wall, and a groove bottom extending between said first and second walls, and wherein said first and second walls enclose an equal angle with said groove bottom of between 65 and 179°.

11. The cutter bar according to claim 10, wherein said angle between said groove bottom and each of said first and second walls lies between 85 to 98°.

12. The cutter bar according to claim 1, wherein said length of said strip upper face is 1 to 5 mm and said length of said lateral face is 5 to 10 mm.

13. The cutter bar according to claim 12, wherein said length of said strip upper face is approximately 3 mm and said length of said strip lateral face is of approximately 7.5 mm.

14. The cutter bar according to claim 1, wherein said hard metal profile strip is fastened in said groove with an adhesive.

15. The cutter bar according to claim 1, wherein said hard metal profile strip is fastened in said groove with a solder layer.

16. The cutter bar according to claim 1, which further comprises a wear resistant layer applied to said upper face of said cutter body.

17. The cutter bar according to claim 16, wherein said wear resistant layer is a flame sprayed layer.

18. The cutter bar according to claim 16, wherein the wear resistant layer reaches up to said groove in said cutter body.

19. The cutter bar according to claim 16, which comprises a coating-free zone between said wear resistant layer and said hard metal profile strip, said coating-free zone having a length of 1 to 5 mm.

20. The cutter bar according to claim 19, wherein said coating-free zone has a length of approximately 3 mm.

* * * * *